United States Patent
Tabeta et al.

(10) Patent No.: US 8,925,663 B2
(45) Date of Patent: Jan. 6, 2015

(54) CONSTRUCTION MACHINE

(75) Inventors: Hiroshi Tabeta, Konan (JP); Shogo Kimura, Ritto (JP); Yasuo Ooshima, Kusatsu (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/994,814

(22) PCT Filed: Jan. 17, 2012

(86) PCT No.: PCT/JP2012/050813
§ 371 (c)(1),
(2), (4) Date: Jun. 17, 2013

(87) PCT Pub. No.: WO2012/108232
PCT Pub. Date: Aug. 16, 2012

(65) Prior Publication Data
US 2013/0302125 A1 Nov. 14, 2013

(30) Foreign Application Priority Data
Feb. 7, 2011 (JP) ................. 2011-023822

(51) Int. Cl.
| E02F 9/16 | (2006.01) |
| E02F 9/08 | (2006.01) |
| E02F 3/28 | (2006.01) |
| B60H 3/06 | (2006.01) |
| E02F 3/32 | (2006.01) |

(52) U.S. Cl.
CPC .............. *E02F 9/16* (2013.01); *B60H 3/0616* (2013.01); *E02F 9/0858* (2013.01); *E02F 3/28* (2013.01); *E02F 3/325* (2013.01); *E02F 9/163* (2013.01)
USPC .................... 180/68.4; 296/190.09

(58) Field of Classification Search
CPC .............. E02F 9/16; E02F 3/28; B60K 11/04; B60R 19/52; B62D 25/084; B60H 3/06
USPC .......... 414/190.09, 687; 180/68.1, 68.4, 68.6; 296/190.01, 190.08, 190.09; 165/42
See application file for complete search history.

(56) References Cited

U.S. PATENT DOCUMENTS 4,088,364 A * 5/1978 Termont .................... 296/190.09
4,531,453 A * 7/1985 Warman et al. ............... 454/139
(Continued)

FOREIGN PATENT DOCUMENTS

| JP | 04-027618 A | 1/1992 |
| JP | 09-290631 A | 11/1997 |
| JP | 2001-071736 A | 3/2001 |
| JP | 2002-087043 A | 3/2002 |
| JP | 2004-142663 A | 5/2004 |

*Primary Examiner* — John Walters
*Assistant Examiner* — Brian Swenson
(74) *Attorney, Agent, or Firm* — Mattingly & Malur, PC

(57) ABSTRACT

An upper revolving structure is provided with a revolving frame, a floor member, and a cab box. On this, an indoor unit for an air conditioner is provided on the floor member, and an outdoor air inlet port is provided by being opened to the outside of the cab box. An outdoor air duct is provided for supplying outdoor air introduced through the outdoor air inlet port toward the indoor unit. In this duct, an intermediate portion is arranged at a high position on the side of an operator's seat, and on this intermediate portion, a filter accommodating portion is provided by being opened into the cab box. In the filter accommodating portion, an outdoor air filter for trapping dusts in the outdoor air flowing through the outdoor air duct is accommodated capable of being attached and removed.

3 Claims, 16 Drawing Sheets

(56) References Cited

U.S. PATENT DOCUMENTS

| | | | |
|---|---|---|---|
| 5,643,080 A * | 7/1997 | Kondoh et al. | 454/155 |
| 5,911,624 A * | 6/1999 | Stauffer | 454/158 |
| 7,069,736 B2 * | 7/2006 | Kamimae et al. | 62/244 |
| 7,559,601 B2 * | 7/2009 | Ishii et al. | 296/190.08 |
| 8,430,450 B2 * | 4/2013 | Stephens et al. | 296/190.09 |
| 2007/0131262 A1 * | 6/2007 | Ishii et al. | 134/123 |
| 2008/0163634 A1 * | 7/2008 | Yoshii | 62/244 |
| 2010/0072782 A1 * | 3/2010 | Modzik, Jr. et al. | 296/190.09 |

* cited by examiner

CONSTRUCTION MACHINE

TECHNICAL FIELD

The present invention relates to a construction machine such as a hydraulic excavator provided with an indoor unit for an air conditioner in a cab box.

BACKGROUND ART

In general, a hydraulic excavator which is a typical example of a construction machine is composed of an automotive lower traveling structure, an upper revolving structure rotatably mounted on the lower traveling structure, and a working mechanism provided capable of moving upward/downward on the front side of the upper revolving structure.

The upper revolving structure is composed of a revolving frame forming a support structural body, a floor member provided on the revolving frame, in which the rear side is an operator's seat mounting portion on which an operator's seat is mounted and the front side is a foot rest portion on which the operator places the foot, a cab box provided by covering the periphery and the upper part of the floor member in order to form an operator's room on the floor member, an indoor unit for an air conditioner arranged on the floor member and supplying sucked air into the cab box as conditioned air, an outdoor air inlet port provided by being opened to the outside of the cab box, and an outdoor air duct provided by connecting the outdoor air inlet port and the indoor unit and supplying the outdoor air introduced through the outdoor air inlet port into the indoor unit. On the cab box, a door to be opened/closed when the operator gets on/off is provided on the left side face.

Here, the outdoor air inlet port is located on the rear side of the cab box and provided by being opened to the outside, and an outdoor air filter for trapping dusts in the outdoor air to be introduced is provided at a position of this outdoor air inlet port. In this case, a filter cap is provided at the outdoor air inlet port for preventing removal of the outdoor air filter. In replacement of the filter, the filter cap is removed, the outdoor air filter is attached to the outdoor air inlet port, dusts are trapped by this outdoor air filter, and clean air is supplied into the indoor unit for an air conditioner (Patent Document 1).

PRIOR ART DOCUMENT

Patent Document

Patent Document 1: Japanese Patent Laid-Open No. 2002-87043 A

SUMMARY OF THE INVENTION

According to the above described Patent Document 1, the outdoor air filter is arranged so as to be attached/removed from the outside on the rear side of the cab box. Therefore, in order to carry out a maintenance work such as inspection, cleaning and the like of the outdoor air filter, a worker needs to go around the outside of the cab box and to carry out the work from the outside, which causes a problem that labor is required for the maintenance work of the outdoor air filter.

Moreover, in a case when the outdoor air filter is provided at the position of the outdoor air inlet port, rainwater having penetrated through the outdoor air inlet port or water during carwash might adhere to the air filter. If moisture adheres to the outdoor air filter, not only the life of the outdoor air filter is reduced but also there is a concern that moisture having passed the outdoor air filter reaches the indoor unit through the outdoor air duct, and in this case, nonconformity occurs in the indoor unit due to penetration or freezing of the moisture.

In view of the above-discussed problems with the conventional art, it is an object of the present invention to provide a construction machine which can improve workability of the maintenance work such as attachment, removal and the like of the outdoor air filter, prevent adhesion of rainwater or water during carwash to the outdoor air filter and keep the outdoor air filter and the indoor unit in a favorable state.

(1) A construction machine according to the present invention is comprised of an automotive lower traveling structure, an upper revolving structure rotatably mounted on the lower traveling structure, and a working mechanism provided capable of moving upward/downward on the upper revolving structure, and the upper revolving structure is provided with a revolving frame forming a support structural body, a floor member provided on the revolving frame, in which the rear side is an operator's seat mounting portion on which an operator's seat is mounted and the front side is a foot rest portion on which the operator places the foot, a cab box provided by covering the periphery and the upper part of the floor member in order to form an operator's room on the floor member, an indoor unit for an air conditioner arranged on the floor member and supplying sucked air into the cab box as conditioned air, an outdoor air inlet port provided by being opened to the outside of the cab box, and an outdoor air duct provided by connecting the outdoor air inlet port and the indoor unit and supplying the outdoor air introduced through the outdoor air inlet port into the indoor unit.

In order to solve the above described problems, a feature of a configuration employed by the present invention is that the outdoor air duct is arranged so that an intermediate portion between the outdoor air inlet port and the indoor unit passes between the side face of the cab box and the side portion of the operator's seat; a filter accommodation portion is provided by being opened into the cab box in the intermediate portion of the outdoor air duct; and an outdoor air filter for trapping dusts in the outdoor air flowing through the outdoor air duct is configured to be accommodated in the filter accommodating portion capable of being attached and removed.

With this arrangement, since the filter accommodating portion is provided by being opened into the cab box in the intermediate portion of the outdoor air duct passing between the side face of the cab box and the side portion of the operator's seat, by reaching out to the side of the operator's seat in a usual operation of getting on/off the cab box, the outdoor air filter can be attached/removed with respect to the filter accommodating portion.

As a result, when the operator gets into the cab box in order to carry out the work, the operator can carry out the maintenance work such as inspection, cleaning and the like of the outdoor air filter easily. Moreover, since the outdoor air filter is arranged in the cab box, a key for preventing tampering is not necessary and moreover, a cap for protecting the outdoor air filter from mud and dusts can be omitted. Therefore, the outdoor air filter can be attached/removed more easily and moreover, the configuration of the outdoor air duct can be simplified.

On the other hand, since the outdoor air filter is provided in the intermediate portion of the outdoor air duct, the outdoor air filter can be arranged at a position deeper from the outdoor air inlet port. As a result, even if rainwater or water during carwash penetrates through the outdoor air inlet port, the moisture is prevented from adhering to the outdoor air filter, whereby the life of the outdoor air filter is extended and reliability can be improved.

(2) In the present invention, the outdoor air duct is formed having an inverted U-shape so that the intermediate portion comes to the highest position. According to this arrangement, since the filter accommodating portion can be provided in the highest intermediate portion, even if rainwater or water during carwash penetrates through the outdoor air inlet port, adhesion of moisture to the outdoor air filter accommodated in the filter accommodating portion can be prevented.

(3) In the present invention, the outdoor air duct is composed of a rising duct portion which rises and extends from the outdoor air inlet port and becomes the upstream side of the outdoor air filter, the filter accommodating portion provided on the upper part of the rising duct portion which becomes the intermediate portion, and a falling duct portion which falls down from the filter accommodating portion and reaches the indoor unit and becomes the downstream side of the outdoor air filter.

According to this arrangement, since the rising duct portion of the outdoor air duct rises and extends from the outdoor air inlet port, even if rainwater or water during carwash penetrates through the outdoor air inlet port, penetration of moisture can be prevented by the rising duct portion. Therefore, the indoor unit can be protected from the moisture, and the work environment in the cab box can be made favorable. Moreover, since the filter accommodating portion accommodating the outdoor air filter is provided at a high position on the upper part of the rising duct portion, adhesion of moisture to the outdoor air filter can be reliably prevented. Further, since the filter accommodating portion is provided on the upper part of the rising duct portion, this filter accommodating portion can be arranged at a high position which can be easily reached by hand, and the outdoor air filter can be attached/removed easily.

(4) According to the present invention, in the operator's seat mounting portion of the floor member, a mounting opening is provided at a location on the side of the operator's seat, and the filter accommodating portion is configured to be mounted on the mounting opening so as to open upward.

With this arrangement, since the filter accommodating portion of the outdoor air duct can be provided by being opened upward at the location on the side of the operator's seat, the outdoor air filter can be inserted/removed with respect to the filter accommodating portion by using a space on the upper side even in a small operator's room.

MODE FOR CARRYING OUT THE INVENTION

Hereafter, as a construction machine according to an embodiment of the present invention, a crawler type hydraulic excavator will be described below in detail as an example with reference to the drawings FIGS. 1 to 16.

Figure 1:
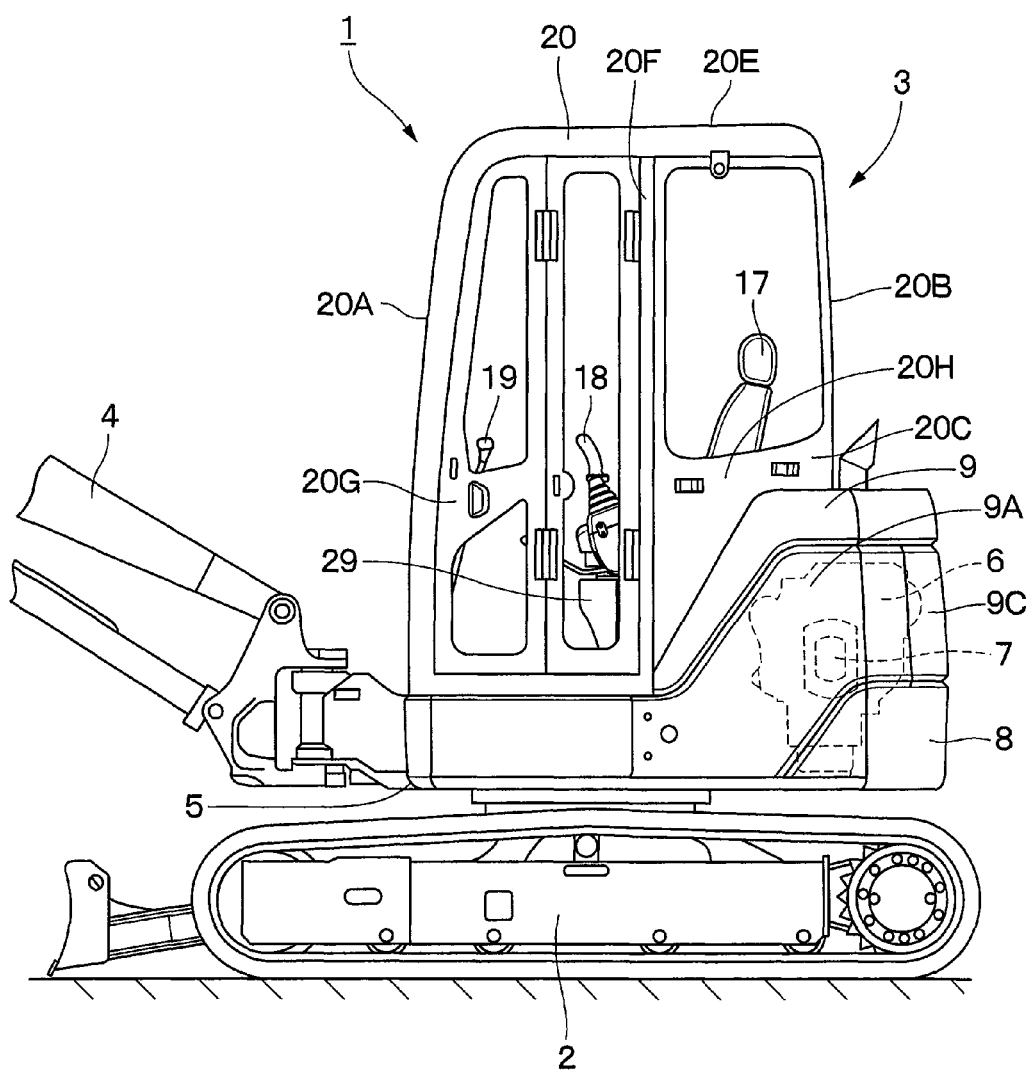
FIG. 1 is a front view illustrating a hydraulic excavator applied to an embodiment of the present invention.

In FIG. 1, designated at 1 is a cab-specified hydraulic excavator as a construction machine applied to this embodiment, and the hydraulic excavator 1 is a small-sized hydraulic excavator called mini excavator suitable for a work in a narrow working site. The hydraulic excavator 1 is constituted by an automotive lower traveling structure 2, an upper revolving structure 3 rotatably mounted on the lower traveling structure 2, and a working mechanism 4 provided on the front side of the upper revolving structure 3 and carrying out an excavating work of earth and sand and the like.

Figure 2:
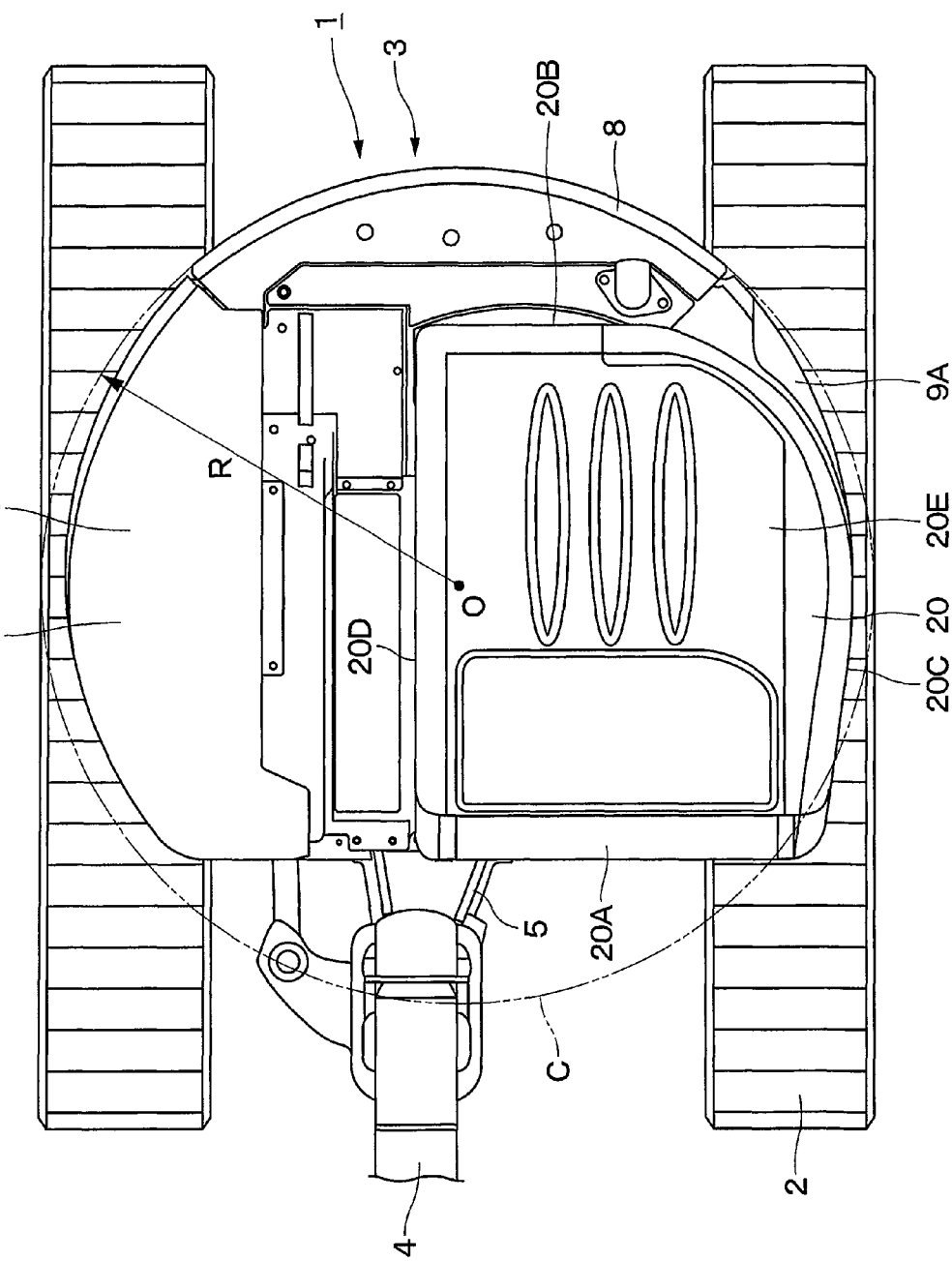
FIG. 2 is a plan view illustrating the hydraulic excavator in an enlarged manner.

Here, as illustrated in FIG. 2, the upper revolving structure 3 has a width dimension in the left and right directions substantially equal to a vehicle width of the lower traveling structure 2 and is also formed having a substantially circular shape when seen from the above so that it is accommodated in an imaginary circle C having a revolving radius R around a revolving center O. Therefore, the hydraulic excavator 1 is configured as a hydraulic excavator of a rear small turn type in which a rear surface of a counterweight 8 which will be described later is substantially accommodated within a vehicle width of the lower traveling structure 2 when the upper revolving structure 3 revolves on the lower traveling structure 2 around the revolving center O.

The above described revolving radius R is defined by a distance from the revolving center O to the rear surface of the counterweight 8, and the above described imaginary circle C is a trajectory of the rear surface of the counterweight 8 when the upper revolving structure 3 revolves.

The upper revolving structure 3 is composed of a revolving frame 5, an engine 6, the counterweight 8, a floor member 10, an operator's seat 17, a cab box 20, an indoor unit 21, an indoor air duct 22, an indoor air filter 23, an outdoor air duct 24, an outdoor air filter 28 and the like which will be described later.

Designated at 5 is the revolving frame of the upper revolving structure 3. This revolving frame 5 forms a support structural body of the upper revolving structure 3 mounted on the lower traveling structure 2. On the front side of the revolving frame 5, a working mechanism 4 is mounted capable of swing and moving upward/downward.

The engine 6 is mounted on the rear side of the revolving frame 5, and the engine 6 is to rotate and drive a hydraulic pump (indicated by a dotted line in FIG. 1, respectively). The counterweight 8 is provided on the rear part of the revolving frame 5. This counterweight 8 takes a weight balance with the working mechanism 4 and is formed being curved having an arc shape so as to cover the rear side of the engine 6.

An exterior cover 9 is provided on the revolving frame 5 by being located around the cab box 20 (floor member 10) which will be described later. As illustrated in FIGS. 1 and 2, this exterior cover 9 is composed of a left side cover part 9A located on the left side of the cab box 20 and covering a space between the cab box 20 and the counterweight 8, a right side opening/closing cover part 9B located on the right side of the cab box 20 and accommodating various tanks (not shown) capable of being opened/closed, and an engine cover part 9C provided on the counterweight 8 capable of being opened/closed.

Figure 6:
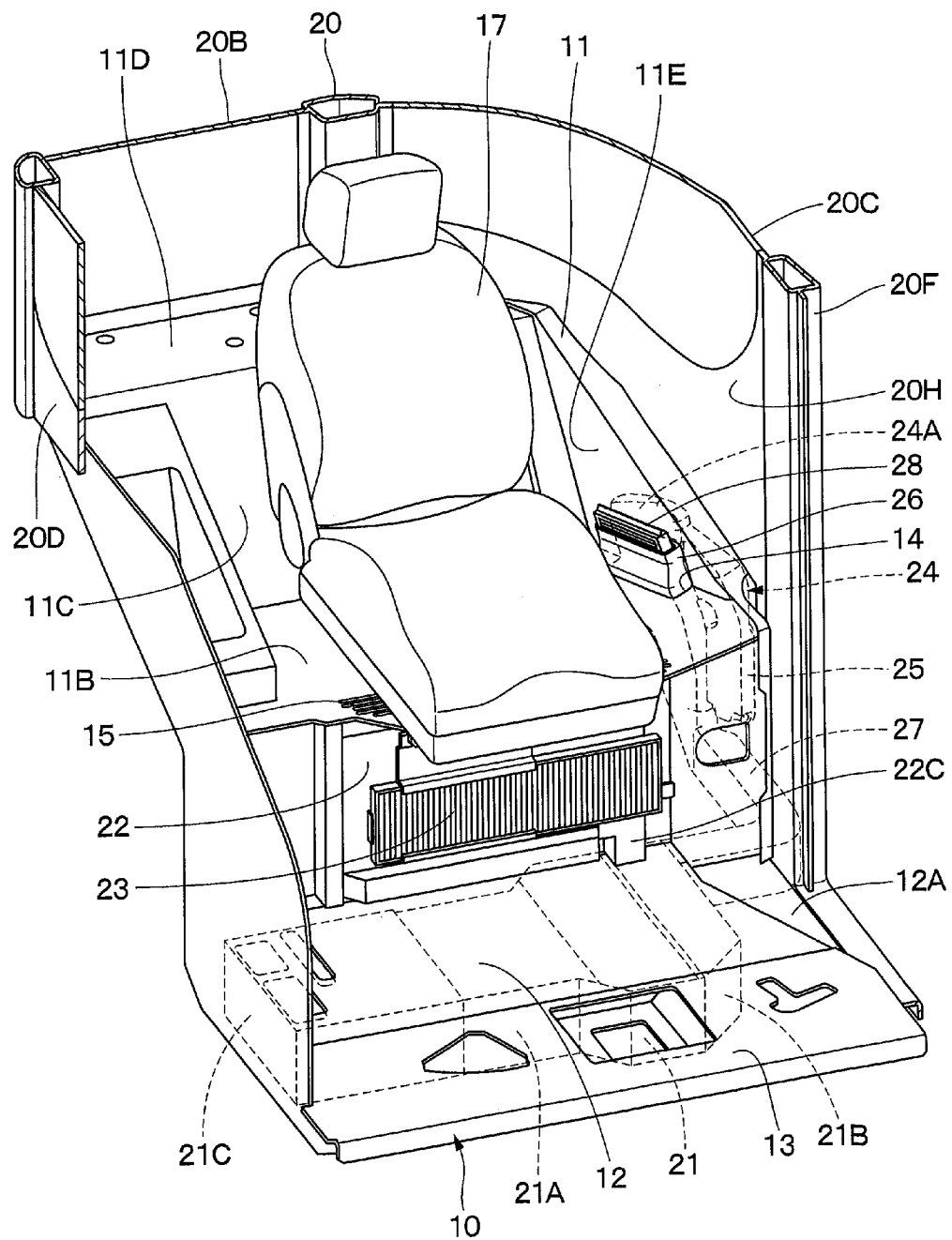
FIG. 6 is a perspective view of the inside of the cab in a state in which the operating lever for work and a front cover are removed when seen from the position similar to that in FIG. 4.
Figure 7:
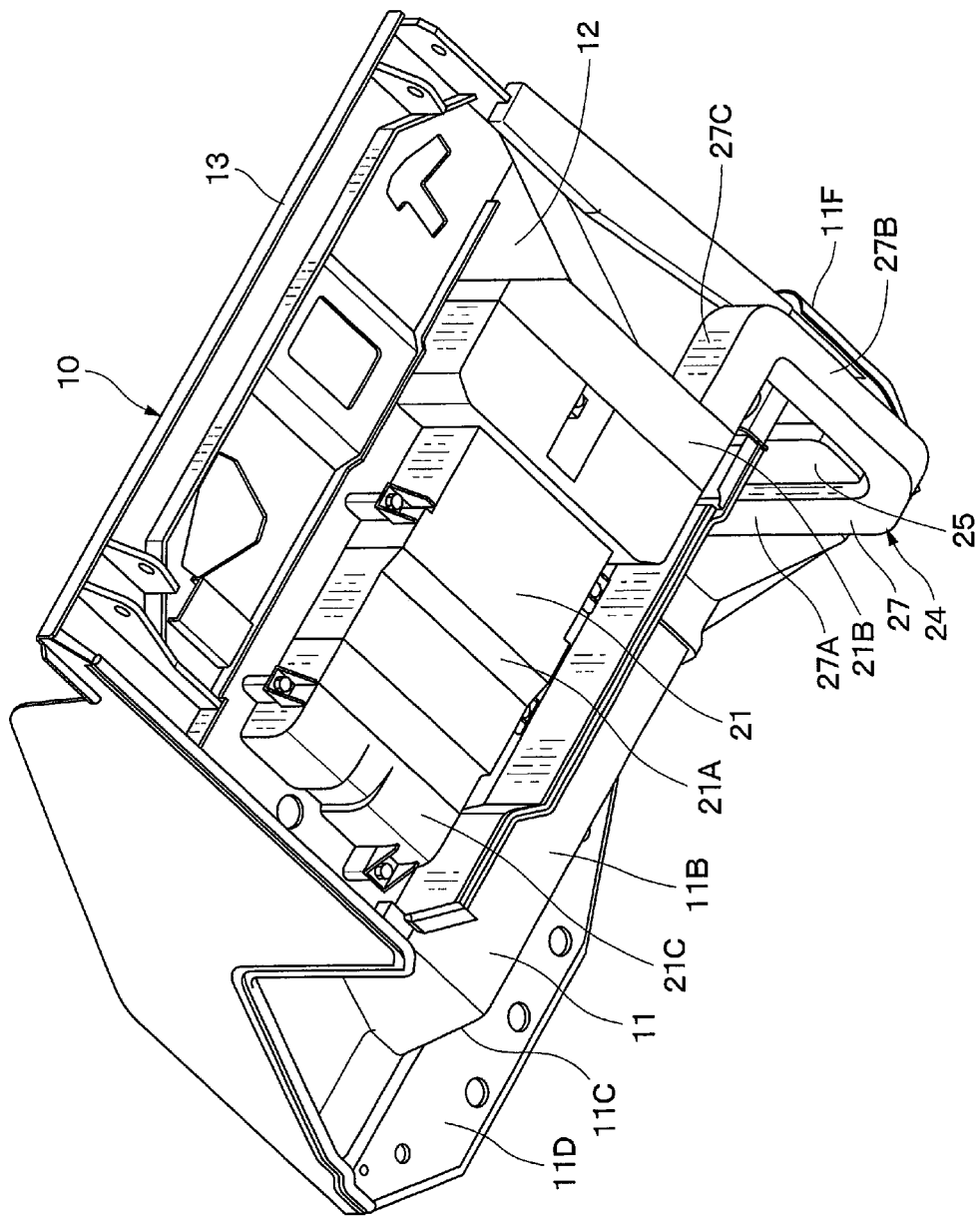
FIG. 7 is a perspective view of a mounted state of an indoor unit and an outdoor air duct with respect to the floor member when seen from the lower side.

Designated at 10 is the floor member provided closer to the left side on the revolving frame 5. This floor member 10 can be tilted up/down together with the operator's seat 17, the cab box 20, the indoor unit 21, the outdoor air duct 24 and the like which will be described later, by using the front side position as a fulcrum by having the front side position supported by the front side position of the revolving frame 5. As illustrated in FIGS. 6 and 7, the floor member 10 is composed of an operator's seat mounting portion 11, a foot rest portion 12, a lever/pedal mounting portion 13 and the like which will be described later.

Figure 8:
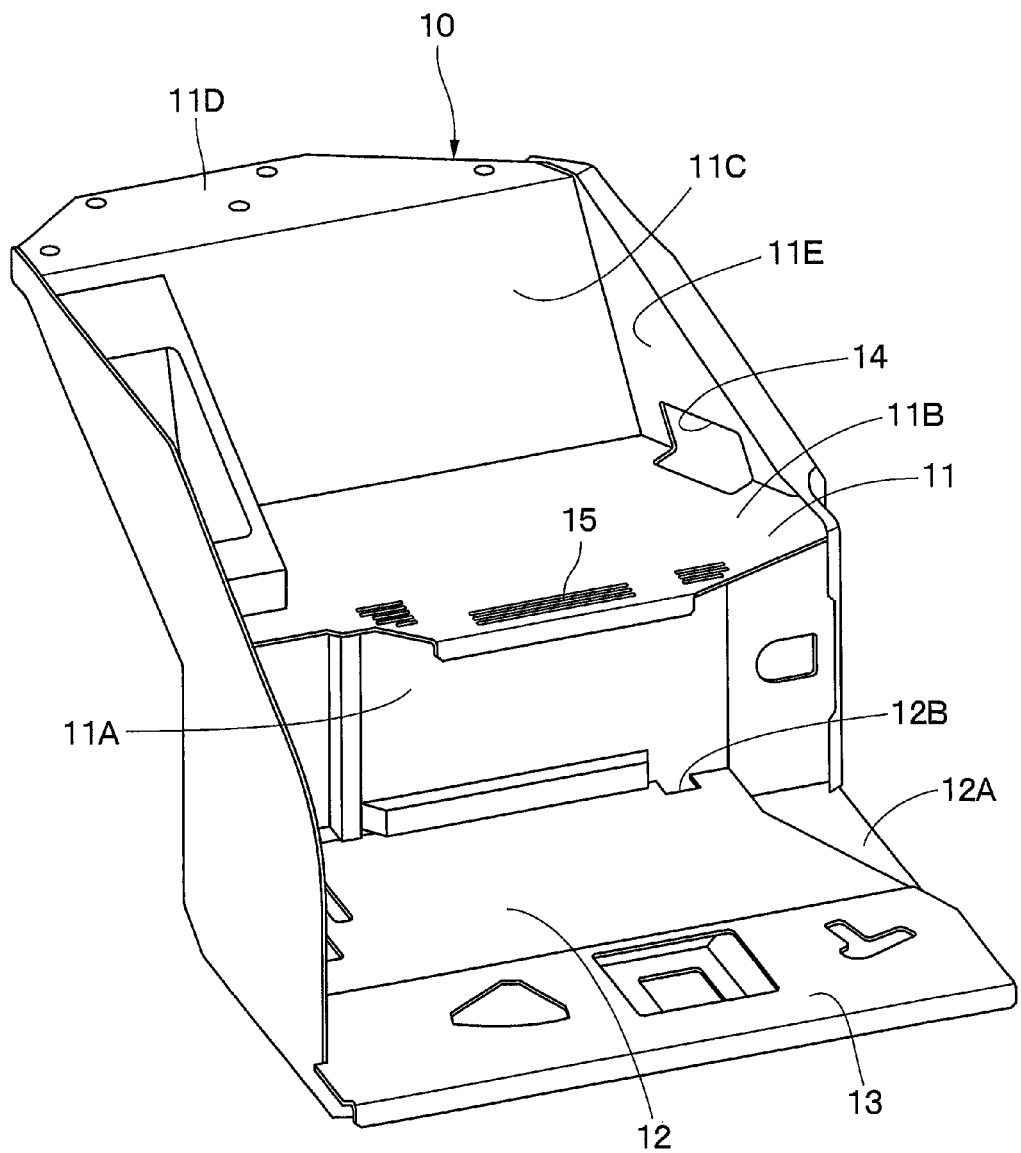
FIG. 8 is a perspective view of the floor member as a single body when seen from the front side.
Figure 9:
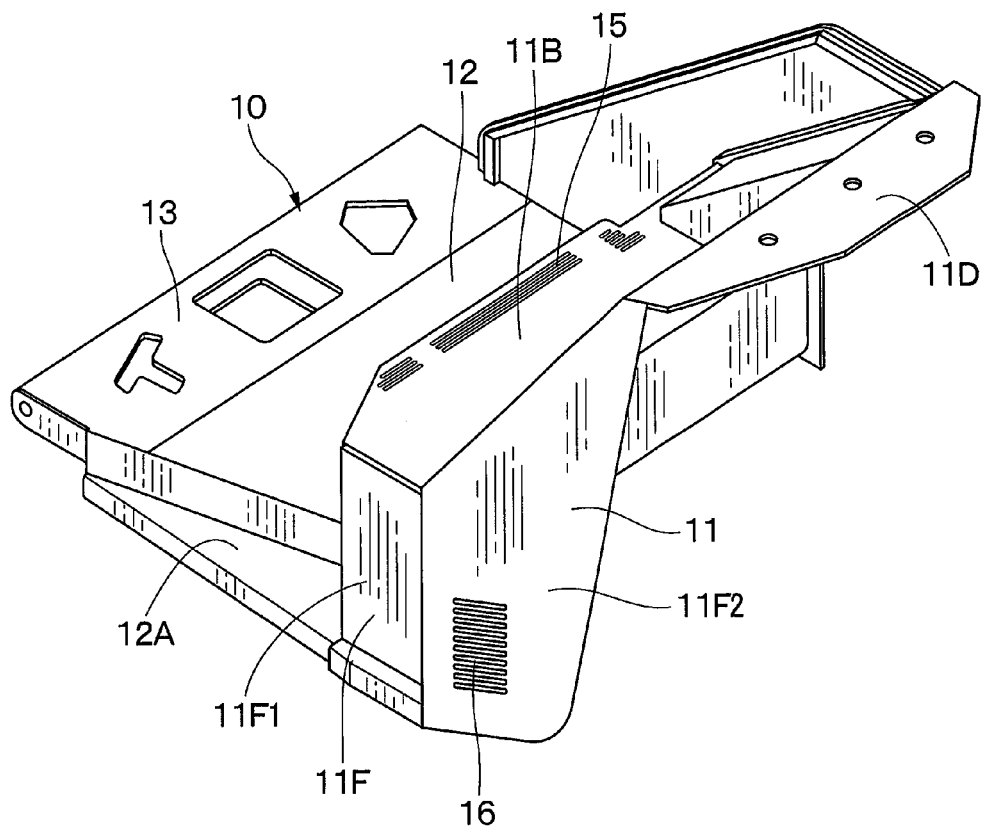
FIG. 9 is a perspective view of the floor member as a single body when seen from the rear side.

The operator's seat mounting portion 11 is formed having a step located on the rear side of the floor member 10, and on the operator's seat mounting portion 11, the operator's seat 17 which will be described later is mounted. As illustrated in FIGS. 8 and 9, the operator's seat mounting portion 11 is composed of a front plate 11A rising from the rear part of the foot rest portion 12 and extending to the upper side, a substantially flat seat plate 11B extending from the upper part of the front plate 11A to the rear side and on which the operator's seat 17 is placed, a back plate 11C extending to the upper side from the rear part of the seat plate 11B in a state inclined to the rear side, and a mounting plate 11D extending from the upper part of the back plate 11C to the rear side substantially in the horizontal direction.

On the left sides of the seat plate 11B and the back plate 11C, a triangular shaped inner side surface plate 11E extending with inclination to the back plate 11C side while bending upward from the left end portion of the seat plate 11B is provided (See FIG. 8). The bending position between this inner side surface plate 11E and the seat plate 11B is located on the left side of the operator's seat 17 which will be described later, and a mounting opening 14 which will be described later is provided at this bending position.

Figure 10:
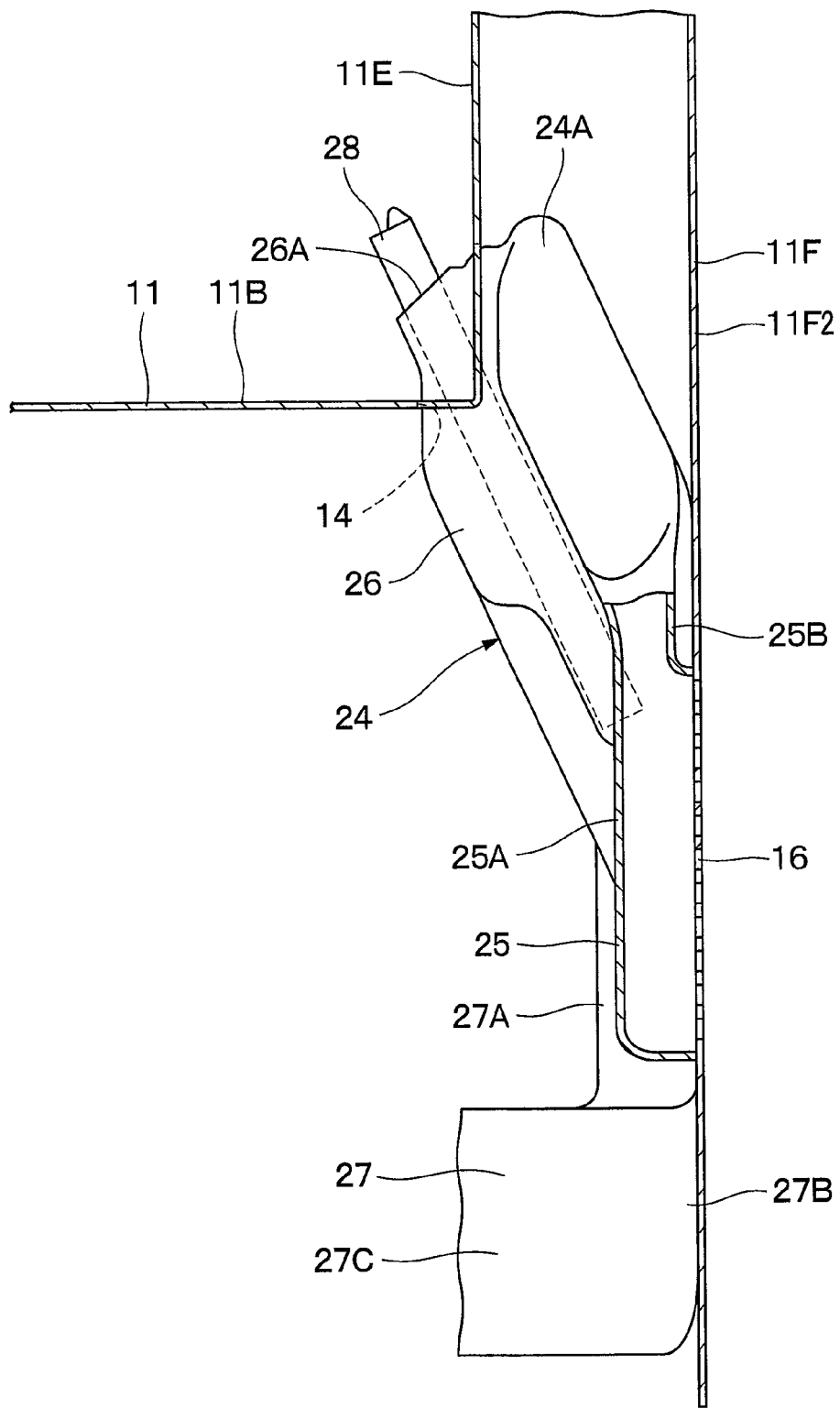
FIG. 10 is an enlarged sectional view of an essential part of the mounted state of the outdoor air duct with respect to the floor member when seen from an arrow X-X direction in FIG. 3.

Moreover, as illustrated in FIGS. 9 and 10, on the operator's seat mounting portion 11, an outer side surface plate 11F is provided at the location on the left side which becomes the outside of the inner side surface plate 11E, and the outer side surface plate 11F is formed extending in the vertical direction so as to oppose the inner side surface plate 11E with a gap. The outer side surface plate 11F is composed of a rectangular shaped front surface portion 11F1 located on the front side and extending substantially linearly in the front and rear directions and a substantially trapezoidal rear surface portion 11F2 extending to the rear right side diagonally from the rear end portion of the front surface portion 11F1. In the rear surface portion 11F2, an outdoor air inlet port 16 which will be described later for introducing air (outdoor air) outside the cab box 20 is provided. Moreover, in a gap space between the inner side surface plate 11E and the outer side surface plate 11F, the outdoor air duct 24 which will be described later is accommodated.

The foot rest portion 12 of the floor member 10 is on which the operator seated on the operator's seat 17 places his/her foot and is provided on the front side of the operator's seat mounting portion 11. This foot rest portion 12 is formed as a rectangular shaped flat plate body which is lengthy in the left and right directions. The left end of the foot rest portion 12 which becomes the side of a door 20G of the cab box 20 which will be described later is a stepped foot step portion 12A on which the operator hooks his/her foot when getting on/off the operator's room. Moreover, on the rear side of the foot rest portion 12 and at a position closer to the foot step portion 12A, a notched portion 12B is formed. This notched portion 12B is formed such that a connecting duct portion 22C is fitted therein when the indoor air duct 22 is mounted on the floor member 10.

A lever/pedal mounting portion 13 is provided on the front side of the foot rest portion 12 and extends in the left and right directions along the front end of the foot rest portion 12. On the lever/pedal mounting portion 13, an operating lever/pedal 19 for traveling which will be described later and the like are mounted.

The mounting opening 14 is provided on the left side of the operator's seat mounting portion 11 (See FIG. 8 and the like). This mounting opening 14 is provided on the left side of the operator's seat 17, that is, it is opened having an L-shape at the bending position between the inner side surface plate 11E and the seat plate 11B of the operator's seat mounting portion 11. This mounting opening 14 is to mount a filter accommodating portion 26 of the outdoor air duct 24 which will be described later so as to open upward and is formed as a rectangular shaped opening which is lengthy in the front and rear directions.

Here, the position on the left side of the operator's seat 17 at which the mounting opening 14 is provided is a position where a worker who gets onto the foot rest portion 12 of the floor member 10 can reach by reaching out to the rear side. Therefore, in case the filter accommodating portion 26 of the outdoor air duct 24 is mounted on the mounting opening 14, the outdoor air filter 28 can be easily mounted/removed with respect to this filter accommodating portion 26.

An indoor air inlet port 15 is provided on the seat plate 11B of the operator's seat mounting portion 11. This indoor air inlet port 15 is to supply the indoor air into an indoor air inlet port 22A of the indoor air duct 22 provided on the front plate 11A and which will be described later and is formed as a plurality of slits extending in the left and right directions on the front portion of the seat plate 11B.

Figure 3:
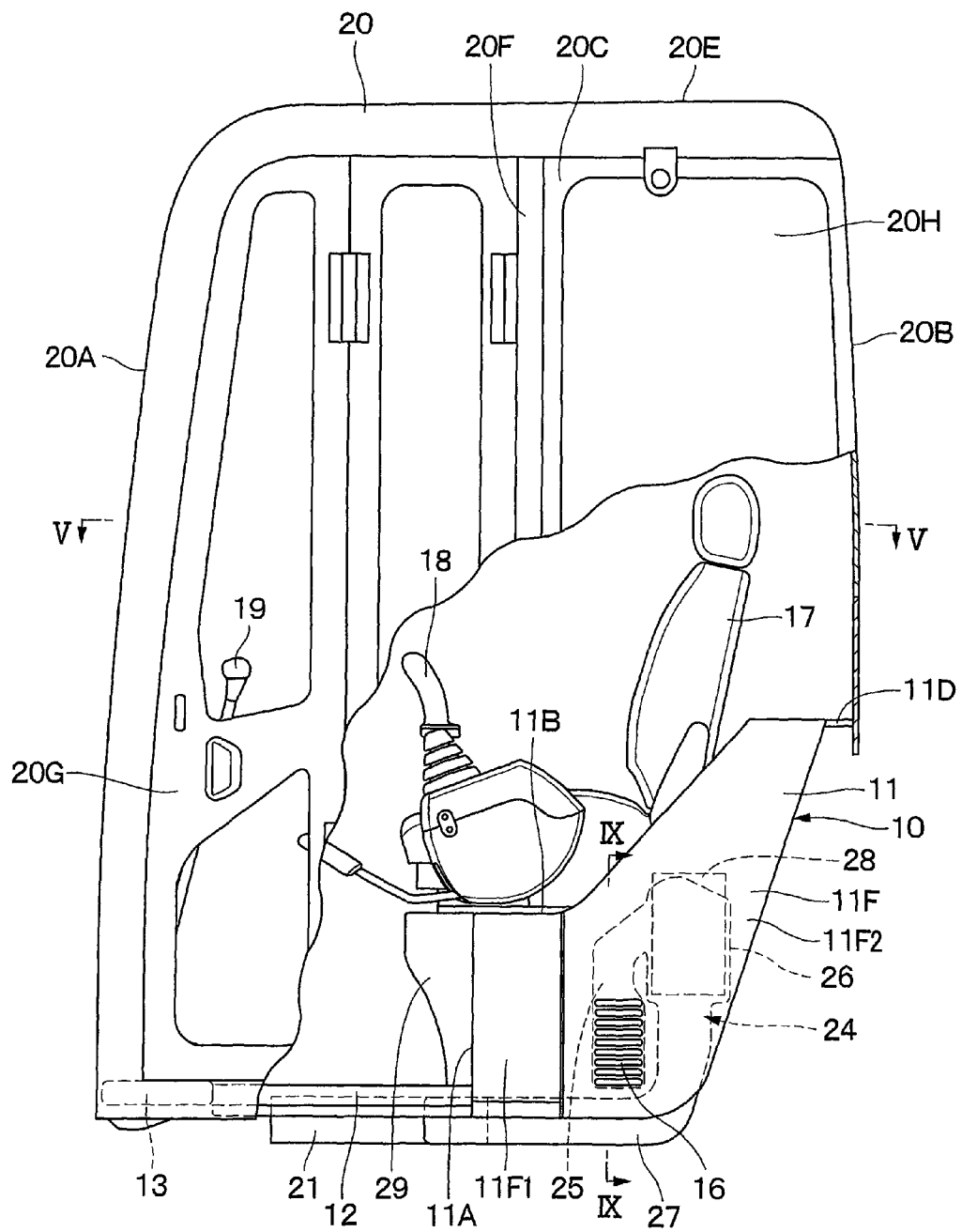
FIG. 3 is a partially broken front view illustrating a cab in FIG. 1 in an enlarged manner.

An outdoor air inlet port 16 is provided on the outer side surface plate 11F of the operator's seat mounting portion 11, and the outdoor air inlet port 16 is opened to the outside of the cab box 20 which will be described later. As illustrated in FIG. 3, this outdoor air inlet port 16 is arranged closer to the lower side of the rear surface portion 11F2 in the outer side surface plate 11F exposed to the outside even in a state in which the cab box 20 is mounted on the floor member 10. Since the outdoor air inlet port 16 is opposed by an inlet side joint port 25A of a rising duct portion 25 forming the outdoor air duct 24 which will be described later, the outdoor air inlet port 16 is formed so as to correspond to the rectangular shaped inlet side joint port 25A which is lengthy in the vertical direction.

More specifically, the outdoor air inlet port 16 is formed as a rectangular shaped opening which is lengthy in the vertical direction by vertically aligning the plurality of slits extending in the lateral direction.

The operator's seat 17 is placed at a center position of the seat plate 11B constituting the operator's seat mounting portion 11. This operator's seat 17 is on which the operator is seated when manipulating the hydraulic excavator 1. On the both left and right sides of the operator's seat 17, an operational lever 18 for work for operating the working mechanism 4 and the like is disposed. Moreover, on the lever/pedal mounting portion 13 on the front of the operator's seat 17, the operating lever/pedal 19 for traveling to be operated by a manual operation or a stepping-on operation when traveling the lower traveling structure 2 and the like are provided.

Figure 4:
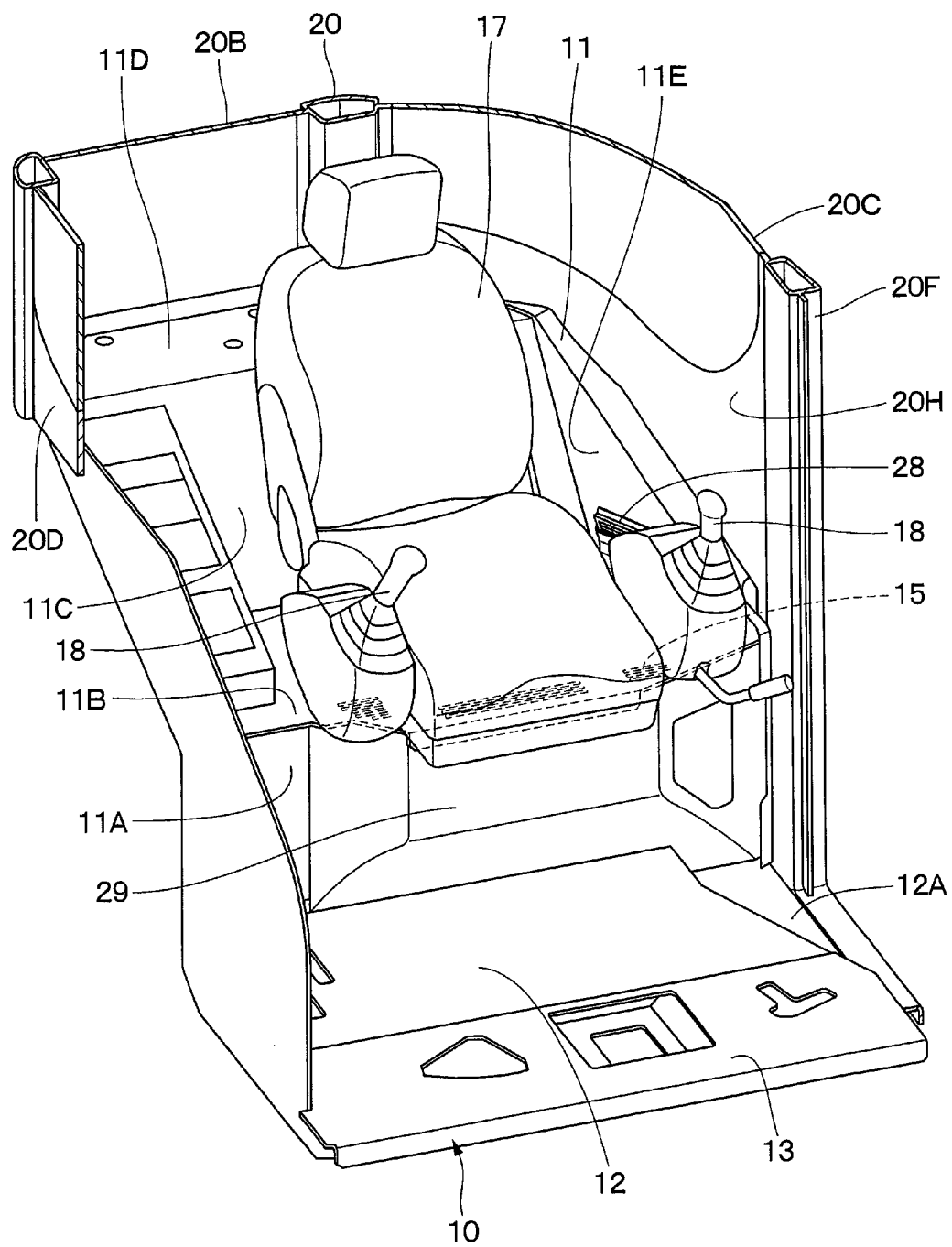
FIG. 4 is a perspective view of a floor member, an operator's seat, an operating lever and the like inside a cab when seen from the front side.
Figure 5:
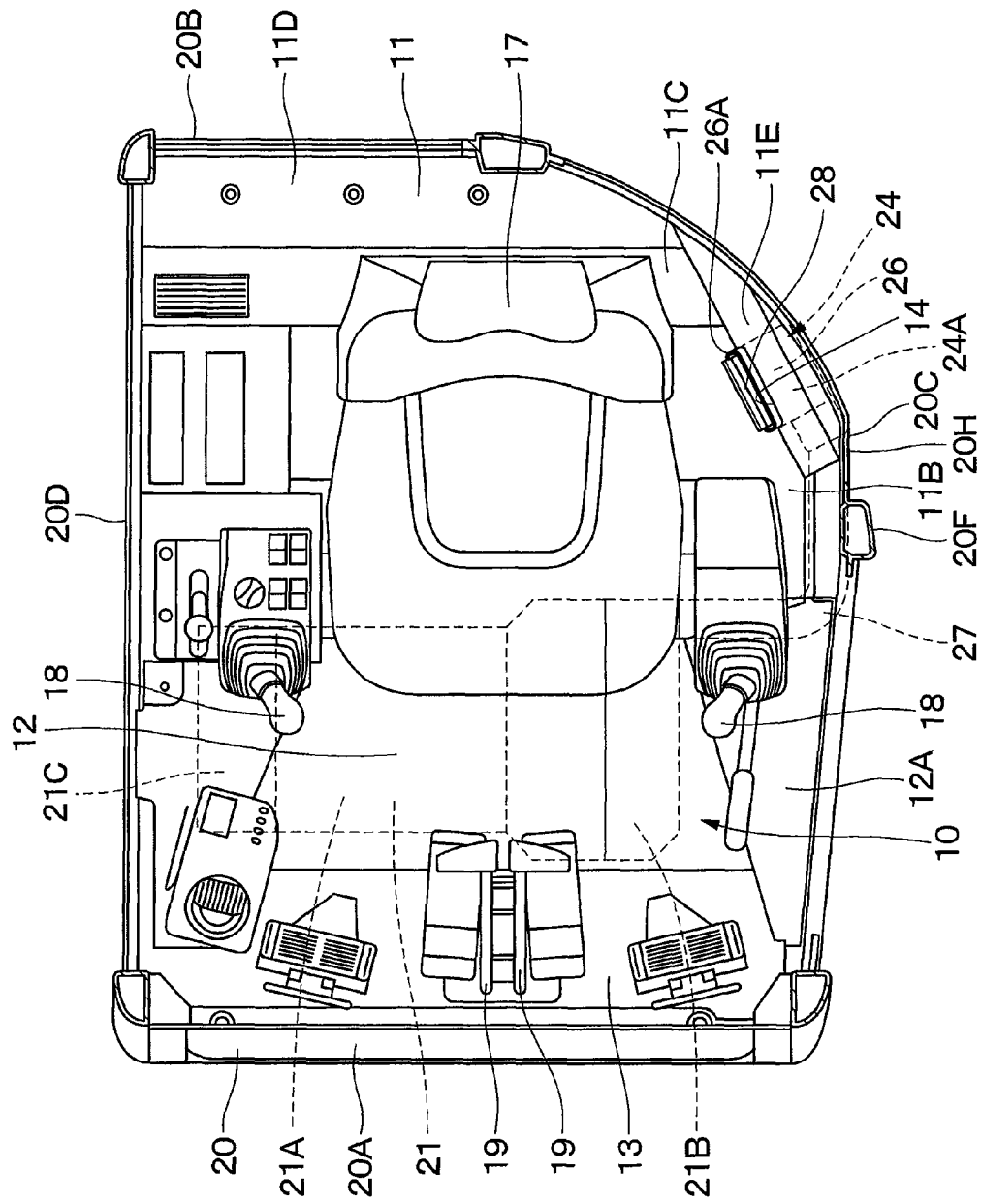
FIG. 5 is a cross sectional view of a structure inside the cab when seen from an arrow V-V direction in FIG. 3.

Designated at 20 is the cab box provided on the floor member 10, and the cab box 20 covers the periphery and the upper part of the floor member 10 which will be described later. As illustrated in FIGS. 3, 4, and 5, the cab box 20 is formed having a box shape by a front surface portion 20A, a rear surface portion 20B, a left side surface portion 20O, a right side surface portion 20D, and a top surface portion 20E, and the lower end portion is mounted on the peripheral edge of the floor member 10. As a result, the cab box 20 forms an operator's room which is a living space for the operator on the floor member 10.

The left side surface portion 20C of the cab box 20 has a center pillar 20F located in the intermediate portion in the front and rear directions and extending in the vertical direction, and on the front side of the center pillar 20F, the door 20G opening/closing a platform is provided rotatably. On the other hand, on the rear side of the center pillar 20F, a side surface panel portion 20H covering the left side of the cab box 20 is provided, and a lower side portion of the side surface panel portion 20H is cut out diagonally so that the outer side surface plate 11F of the operator's seat mounting portion 11 (outdoor air inlet port 16) constituting the floor member 10 is exposed to the outside.

Designated at 21 is the indoor unit forming an indoor machine of an air conditioner (See FIG. 7), and the indoor unit 21 is mounted on the rear surface side of the foot rest portion 12 of the floor member 10. This indoor unit 21 is to suck the outdoor air or the indoor air in the cab box 20 and to supply it as conditioned air conditioned to desired temperature and humidity into the cab box 20.

The indoor unit 21 accommodates a blower fan, an evaporator, a heater core (none of them is shown) and the like within a box-shaped casing 21A extending in the left and right directions. On the left side which is the upstream side of the casing 21A, an inlet side connecting portion 21B to which the connecting duct portion 22C of the indoor air duct 22 which will be described later and an inward duct portion 27C of the outdoor air duct 24 are connected is provided. In this inlet side connecting portion 21B, a switching mechanism (not shown) for switching between the indoor air and the outdoor air is incorporated. On the right side which is the downstream side of the casing 21A, an outlet side connecting portion 21C is provided, and an air conditioning duct (not shown) for supplying the conditioned air into the cab box 20 is connected to the outlet side connecting portion 21C.

Here, as illustrated in FIG. 3, the indoor unit 21 is arranged at a position lower than the outdoor air inlet port 16. In this case, if rainwater or the like flows through the outdoor air inlet port 16, since the rainwater and the like flows to a lower side, it might reach the indoor unit 21. However, in this embodiment, by connecting the outdoor air inlet port 16 and the indoor unit 21 with the inverted U-shaped outdoor air duct 24 which will be described later, inflow of the rainwater and the like into the indoor unit 21 can be reliably prevented.

Figure 11:
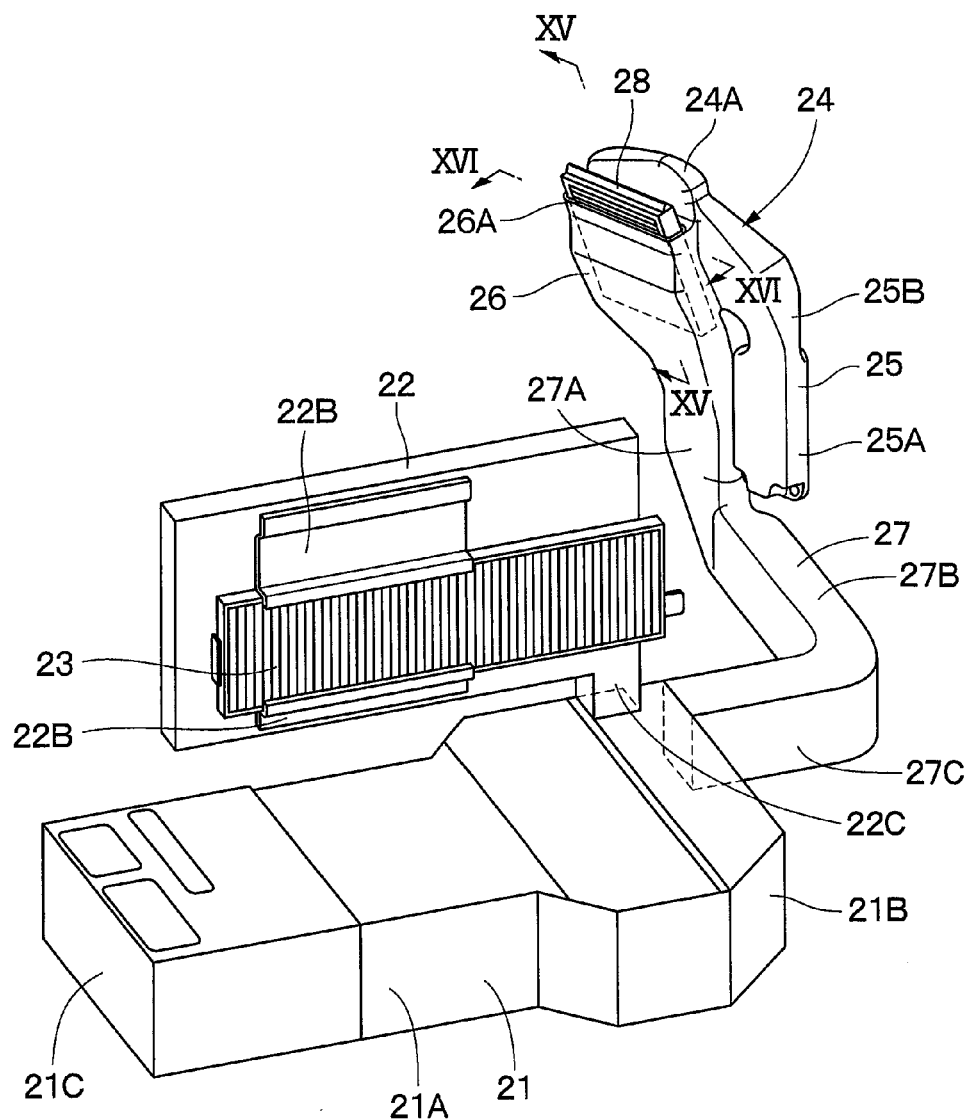
FIG. 11 is a perspective view illustrating a state in which the indoor unit, an indoor air duct, an indoor air filter, the outdoor air duct, the outdoor air filter and the like are assembled.
Figure 12:
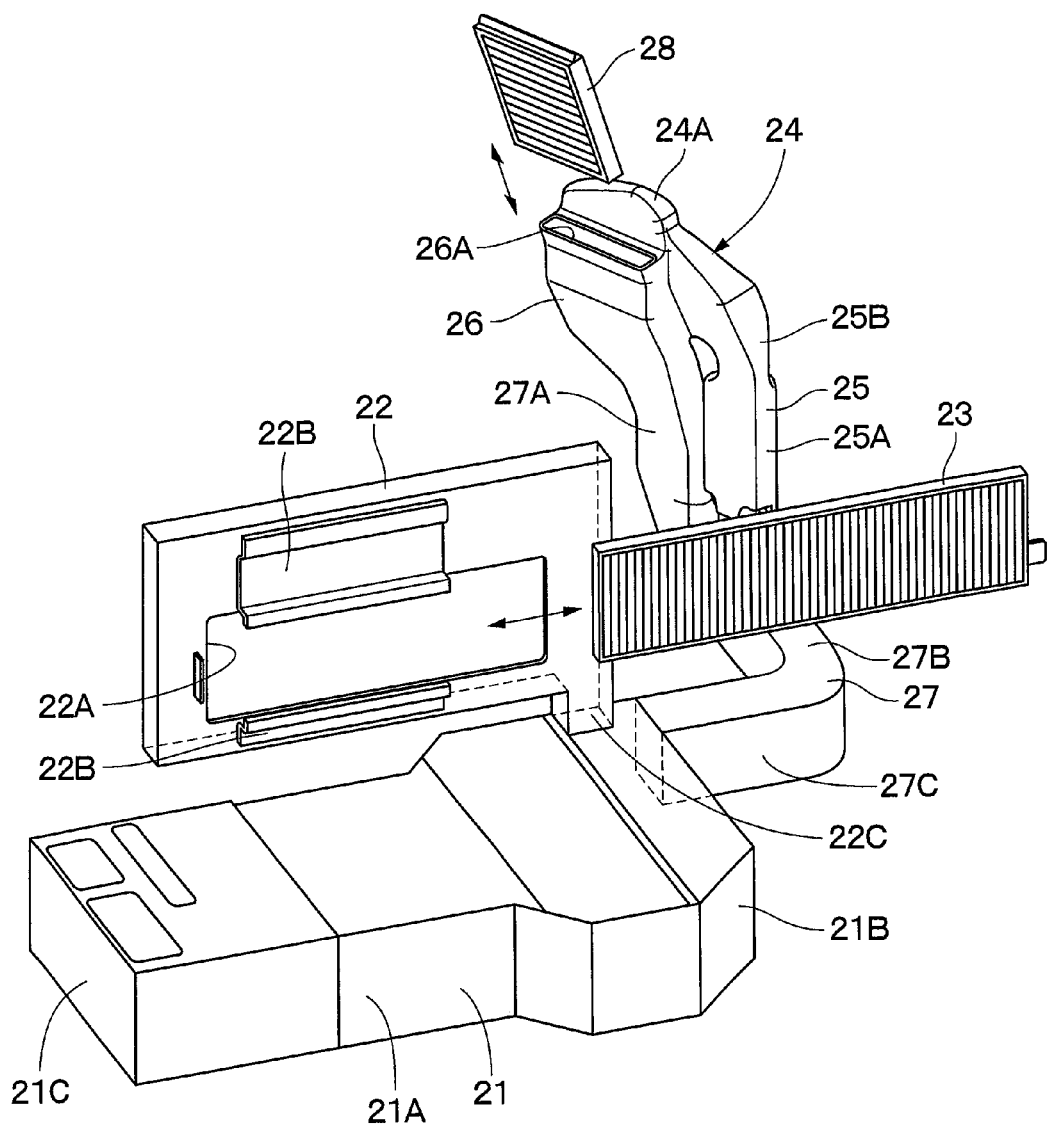
FIG. 12 is an exploded perspective view of a state in which the indoor air filter is removed from the indoor air duct and the outdoor air filter is removed from the outdoor air duct when seen from a position similar to that in FIG. 11.

The indoor air duct 22 is provided on the front plate 11A of the operator's seat mounting portion 11 (See FIGS. 6 and 11). As illustrated in FIG. 12, the indoor air duct 22 has the laterally long indoor air inlet port 22A opened to the front. On the indoor air duct 22, filter guides 22B are provided so as to sandwich the indoor air inlet port 22A from above and below, and the filter guide 22B is to hold the indoor air filter 23 which will be described later capable of being inserted/removed in the left and right directions with respect to the indoor air inlet port 22A. Moreover, on the indoor air duct 22, the connecting duct portion 22C connected to the inlet side connecting portion 21B is provided in order to have the indoor air flowing in through the indoor air inlet port 22A flow through the indoor unit 21.

The indoor air filter 23 is provided on the front surface of the indoor air duct 22, and the indoor air filter 23 is to trap dusts in the indoor air flowing from the indoor air inlet port 15 toward the front surface of the indoor air duct 22 and to have it flow out from the rear surface to the indoor air inlet port 22A. The indoor air filter 23 is formed having a rectangular shape lengthy in the left and right directions so as to cover the indoor air inlet port 22A of the indoor air duct 22 and is removably held by the filter guides 22B.

Designated at 24 is the outdoor air duct which is a characterizing portion of the present invention, provided on the floor member 10. This outdoor air duct 24 is to connect the outdoor air inlet port 16 and the indoor unit 21 to each other and constitutes an air path for supplying the outdoor air introduced through the outdoor air inlet port 16 toward the indoor unit 21. As illustrated in FIGS. 5 and 6, the outdoor air duct 24 is arranged so that the intermediate portion 24A between the outdoor air inlet port 16 and the indoor unit 21 passes between the left side surface portion 20C of the cab box 20 and the side portion of the operator's seat 17. The outdoor air duct 24 is specifically arranged so as to pass the path close to the mounting opening 14 provided on the operator's seat mounting portion 11.

Here, the intermediate portion 24A of the outdoor air duct 24 is located between the rising duct portion 25 which will be described later and the falling duct portion 27, and this intermediate portion 24A is arranged at the highest position in the entire length of the outdoor air duct 24. Therefore, the outdoor air duct 24 is formed as an inverted U-shaped path, and the filter accommodating portion 26 which will be described later is provided at the position of the intermediate portion 24A.

As illustrated in FIGS. 11 to 14, the outdoor air duct 24 is composed of the rising duct portion 25, the filter accommodating portion 26, and the falling duct portion 27, which will be described later. In this embodiment, the outdoor air duct 24 is illustrated as a single member continuing over the entire length and is so explained, but the outdoor air duct 24 may be configured to be divided into a plurality of members in accordance with the peripheral mounting environment.

Figure 14:
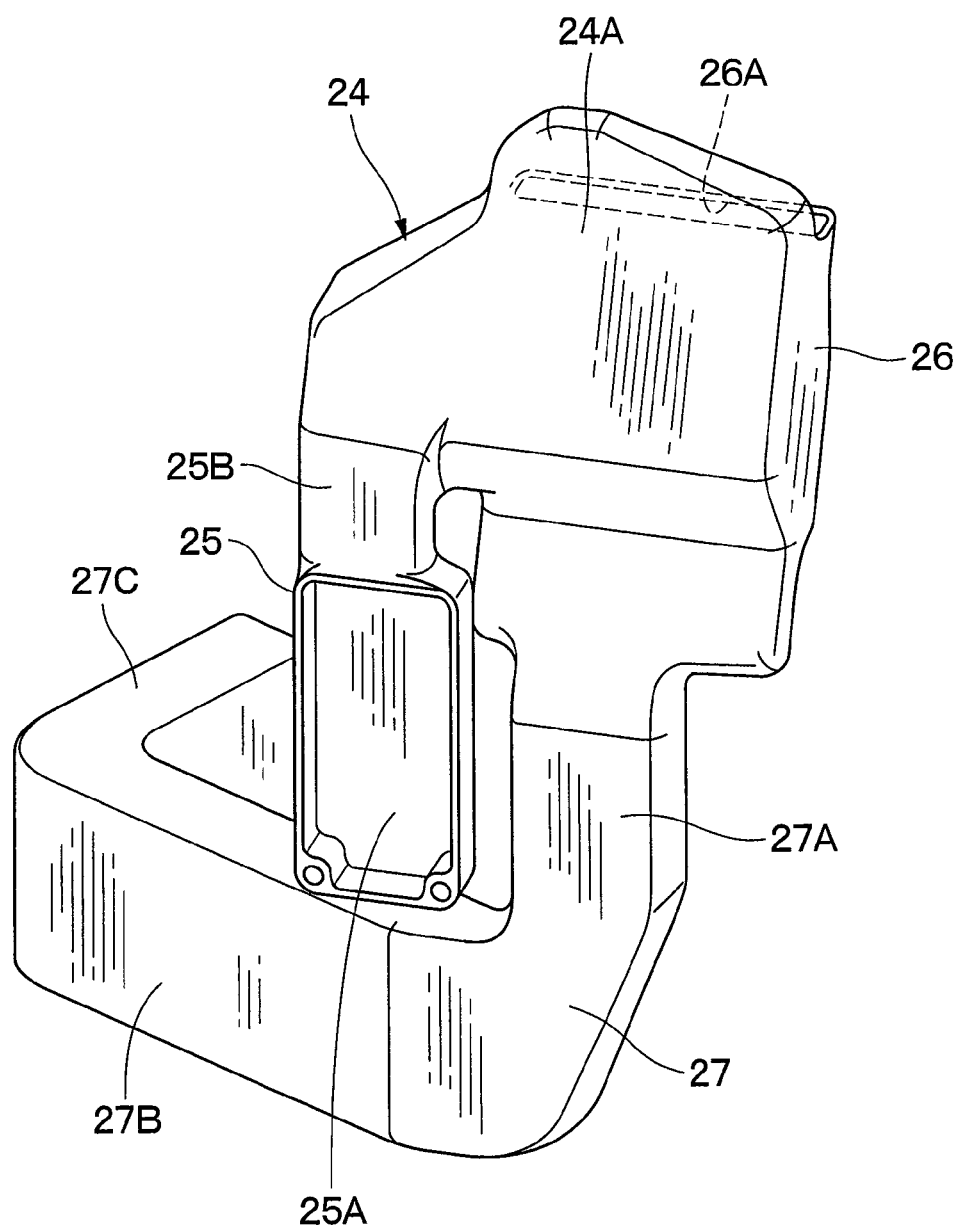
FIG. 14 is a perspective view illustrating the outdoor air duct when seen from an arrow XIV-XIV direction in FIG. 13.

The rising duct portion 25 of the outdoor air duct 24 is provided between the mounting opening 14 of the operator's seat mounting portion 11 and the outdoor air inlet port 16 and is located on the upstream side of the outdoor air filter 28 which will be described later. As illustrated in FIGS. 10 and 14, this rising duct portion 25 extends by rising from the outdoor air inlet port 16. The rising duct portion 25 is composed of the box-shaped inlet side joint port 25A mounted on the outer side surface plate 11F of the operator's seat mounting portion 11 so as to oppose the outdoor air inlet port 16 and a duct portion 25B bent to the rear side while extending to the upper side from the upper part of the inlet side joint port 25A and continuing to the intermediate portion 24A. This inlet side joint port 25A is mounted on the inner surface of the outer side surface plate 11F by using means such as screwing or the like, for example.

Here, since the duct portion 25B in the rising duct portion 25 is provided so as to extend from the upper part of the inlet side joint port 25A to the upper side, even if rainwater or water during carwash penetrates the inlet side joint port 25A through the outdoor air inlet port 16, the rainwater and the like cannot rise through the duct portion 25B and penetration of the moisture can be prevented at this position.

Figure 15:
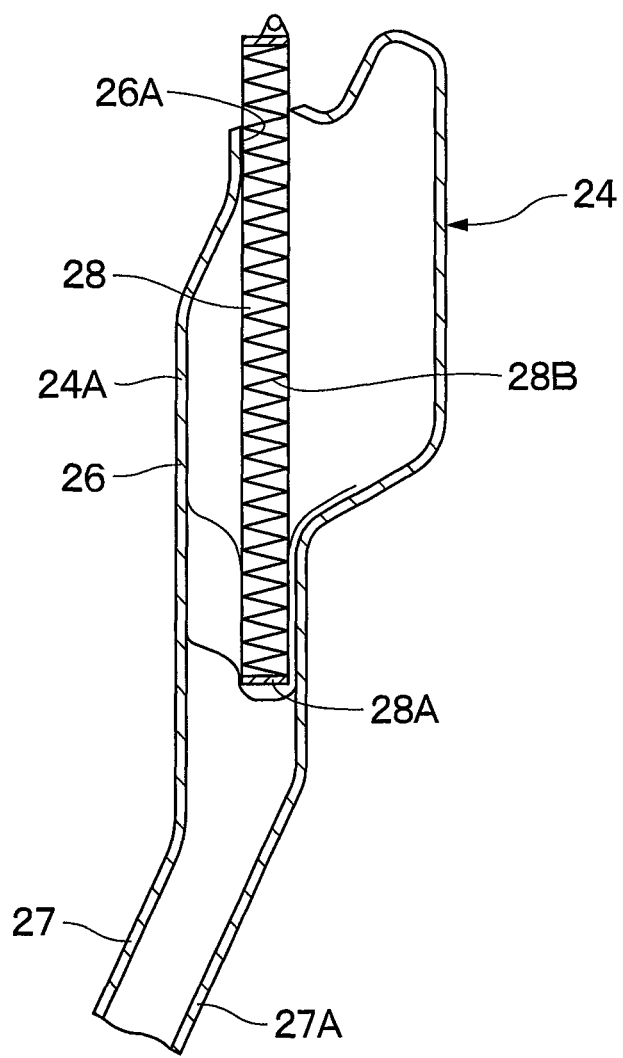
FIG. 15 is an enlarged sectional view illustrating the outdoor air duct and the outdoor air filter when seen from an arrow XV-XV direction in FIG. 11.
Figure 16:
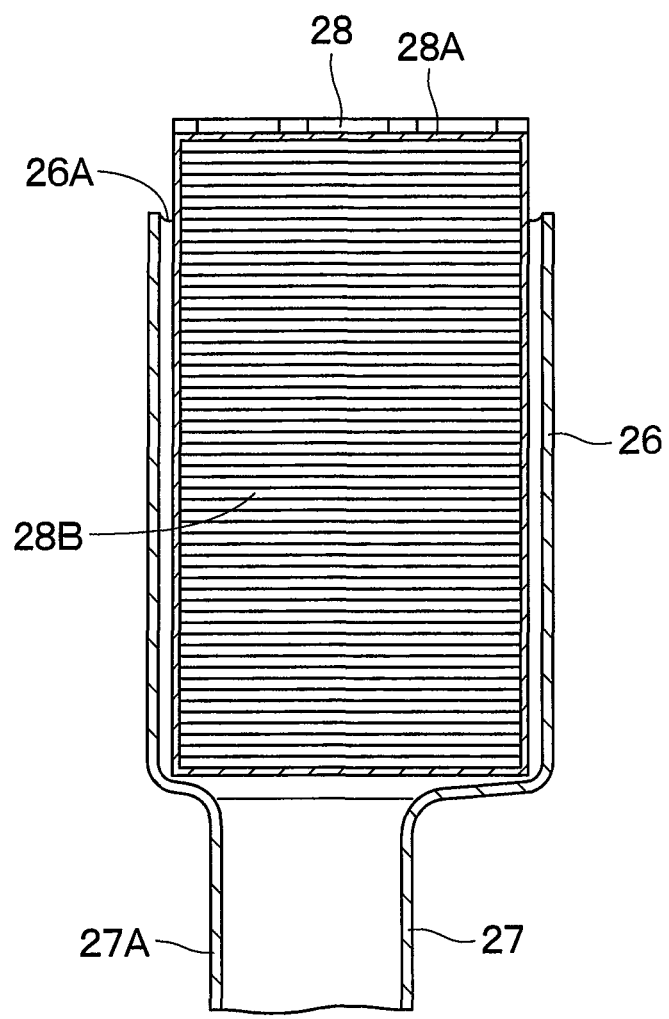
FIG. 16 is a sectional view illustrating the outdoor air duct and the outdoor air filter when seen from an arrow XVI-XVI direction in FIG. 11.

The filter accommodating portion 26 is provided on the intermediate portion 24A of the outdoor air duct 24, that is, on the upper part of the duct portion 25B of the rising duct portion 25. As illustrated in FIGS. 14 to 16, this filter accommodating portion 26 is formed as a thin box body which is flat in the left and right directions and extends in the vertical direction. On the upper part of the filter accommodating portion 26, a filter mounting port 26A which is wide in the front and rear directions and is opened upward is provided. The filter mounting port 26A constitutes an attachment/removal opening through which the outdoor air filter 28 which will be described later is inserted capable of being attached/removed.

Here, the filter accommodating portion 26 is mounted on the operator's seat mounting portion 11 by inserting the upper side portion on which the filter mounting port 26A is provided into the mounting opening 14 provided in the operator's seat mounting portion 11 from the lower side. In this state, the filter mounting port 26A can be arranged so as to be located on the side of the operator's seat 17 and to be opened upward. As illustrated in FIGS. 6 and 10, since the filter mounting port 26A is opened with inclination toward the operator's seat 17 side, the operator can easily insert/remove the outdoor air filter 28 even while being seated on the operator's seat 17.

Moreover, since the filter mounting port 26A of the filter accommodating portion 26 is arranged within the lockable cab box 20, a locking mechanism for preventing tampering and theft can be abolished. Moreover, since it is not subjected to dusts or mud, protective components such as a cap and the like can be also omitted.

The falling duct portion 27 is provided falling from the lower part of the filter accommodating portion 26. This falling duct portion 27 is located on the downstream side of the outdoor air filter 28 and forms an air path leading to the inlet side connecting portion 21B of the indoor unit 21. The falling duct portion 27 is composed of a downward duct portion 27A extending downward from the filter accommodating portion 26, a frontward duct portion 27B extending with bending from the lower end portion of the downward duct portion 27A to the front side, and an inward duct portion 27C extending inward (to the right side) with bending from the front end portion of the frontward duct portion 27B.

The outdoor air duct 24 is to have the outdoor air introduced into the inlet side joint port 25A of the rising duct portion 25 through the outdoor air inlet port 16 flow to the upper side through the rising duct portion 25. At this time, even if rainwater and the like penetrates together with the outdoor air, since the rainwater and the like cannot rise to the upper side through the rising duct portion 25, adhesion of the rainwater and the like to the outdoor air filter 28 which will be described later can be prevented.

Moreover, the outdoor air flowing to the upper side through the rising duct portion 25 reaches the filter accommodating portion 26 and passes through the outdoor air filter 28 accommodated therein, whereby impurities such as dusts are removed. Clean outdoor air in which dusts and the like are removed by the outdoor air filter 28 sequentially flows through the downward duct portion 27A, the frontward duct portion 27B, and the inward duct portion 27C of the falling duct portion 27 and supplied to the inlet side connecting portion 21B of the indoor unit 21.

Figure 13:
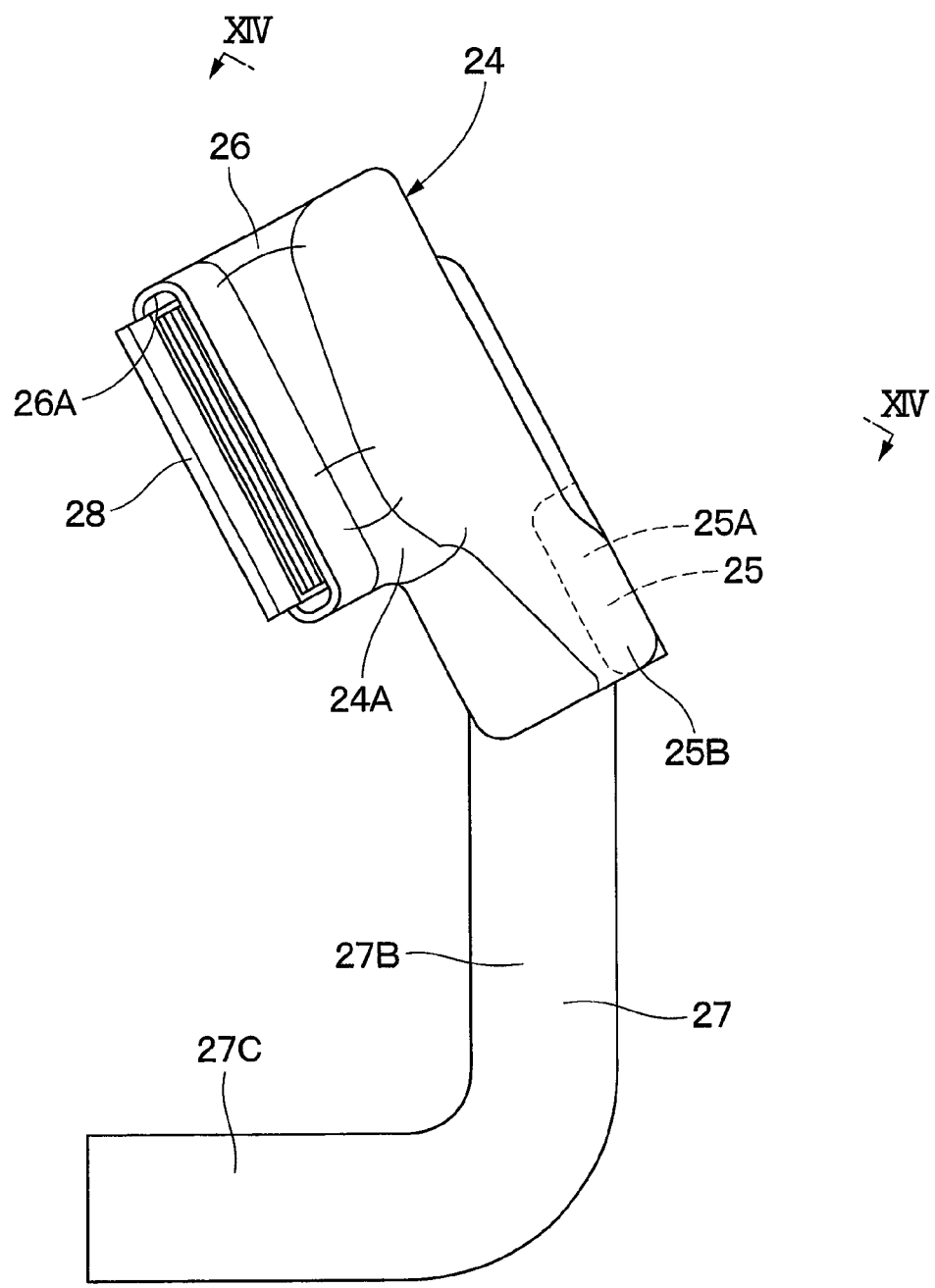
FIG. 13 is a plan view illustrating the outdoor air duct and the outdoor air filter in an enlarged manner.

The outdoor air filter 28 is accommodated in the filter accommodating portion 26 of the outdoor air duct 24 capable of being attached/removed therein (See FIGS. 13, 15, 16 and the like). This outdoor air filter 28 is to trap dusts in the outdoor air flowing through the outdoor air duct 24 toward the indoor unit 21. The outdoor air filter 28 is formed having a rectangular outside shape to be fitted in the filter accommodating portion 26 and can be attached therein by being inserted through the filter mounting port 26A. More specifically, the outdoor air filter 28 is composed of a rectangular shaped frame body 28A and a filter body 28B folded and accommodated in the frame body 28A.

As illustrated in FIG. 15, the outdoor air filter 28 divides the inside of the filter accommodating portion 26 into the rising duct portion 25 side and the falling duct portion 27 side by inserting the filter accommodating portion 26 through the filter mounting port 26A. As a result, the outdoor air filter 28 can trap the dusts in the outdoor air flowing from the rising duct portion 25 side to the falling duct portion 27 side by the filter body 28B. Moreover, since the outdoor air filter 28 is attached to/removed from the filter mounting port 26A of the filter accommodating portion 26 opened upward at the position on the left side of the operator's seat 17, the operator can easily attach/remove it by getting onto the cab box 20 and reaching out to the rear side.

In FIG. 3, designated at 29 is a front cover provided on the front surface of the indoor air filter 23, and the front cover 29 is to cover for defining a space between the indoor air filter 23 and itself. This front cover 29 protects the indoor air filter 23 and guides the indoor air flowing in through the indoor air inlet port 15 toward the front surface of the indoor air filter 23.

The hydraulic excavator 1 according to this embodiment has the configuration as above and its operation will be described below.

The operator who gets onto the operator's room and is seated on the operator's seat 17 operates the operating lever/pedal 19 for traveling so as to make the lower traveling structure 2 travel. On the other hand, the operator can operate the working mechanism 4 and the like so as to carry out an excavating work of earth and sand and the like by operating the left and right operational levers 18 for work.

Here, during the above described work, the indoor unit 21 for an air conditioner is operated in order to make the environment in the cab box 20 favorable. At this time, the indoor unit 21 sucks the indoor air in the cab box 20 or the outdoor air outside that, cools this air by an evaporator in the casing 21A or heats it by a heater core and makes it conditioned air. The indoor unit 21 can adjust this conditioned air to an appropriate temperature by blowing it to the cab box 20.

Since the hydraulic excavator 1 carries out its work at a working site where dusts are blown out, the outdoor air filter 28 provided on the outdoor air duct 24 needs regular maintenance works such as inspection works, cleaning works and the like.

Thus, the operation when the maintenance work for the outdoor air filter 28 is carried out will be described. That is, the operator gets onto the cab box 20 and stands on the foot rest portion 12 of the floor member 10 and by reaching out to the side of the operator's seat 17, the operator can grip and take out the outdoor air filter 28 in the filter accommodating portion 26 of the outdoor air duct 24 arranged between the operator's seat 17 and the left side surface portion 20C of the cab box 20. At this time, since there is no need to carry out an unlock operation, an opening operation of a cap or the like, the outdoor air filter 28 can be easily taken out, and the maintenance work can be carried out. On the other hand, when the maintenance work is finished, the outdoor air filter 28 can be easily accommodated in the filter accommodating portion 26 only by being inserted into the filter accommodating portion 26.

Thus, according to this embodiment, regarding the outdoor air duct 24, the intermediate portion 24A between the outdoor air inlet port 16 opened to the outside and the indoor unit 21 is arranged so as to pass between the operator's seat 17 and the left side surface portion 20C of the cab box 20. Moreover, on the intermediate portion 24A of the outdoor air duct 24, the filter accommodating portion 26 is provided by being opened into the cab box 20, and the outdoor air filter 28 is configured to be accommodated in this filter accommodating portion 26 capable of being attached/removed.

Therefore, when the maintenance work such as inspection, cleaning and the like of the outdoor air filter 28 is to be carried out, by reaching out to the left side of the operator's seat 17 during the normal operation of getting on/off the cab box 20, the outdoor air filter 28 can be attached to/removed from the filter accommodating portion 26.

As a result, when the operator gets onto the cab box 20 for the work, the operator can easily carry out the maintenance work of the outdoor air filter 28. By attaching/removing the outdoor air filter 28 in the cab box 20, a lock for preventing tempering is no longer needed, and a cap for protection from mud and dusts entering from the outside can be omitted. The outdoor air filter 28 can be attached and removed more easily and moreover, the configuration of the outdoor air duct 24 can be simplified.

Moreover, since the intermediate portion 24A of the outdoor air duct 24 is provided at the highest position, and the outdoor air filter 28 is arranged on this intermediate portion 24A, the outdoor air inlet port 16 and the outdoor air filter 28 can be arranged with a distance. Therefore, even if rainwater or water during carwash penetrates the outdoor air inlet port 16, adhesion of this moisture to the outdoor air filter 28 can be prevented, and the life of the outdoor air filter 28 can be prolonged and reliability thereof can be improved.

More specifically, since the intermediate portion 24A of the outdoor air duct 24 can be arranged at the highest position by forming the outdoor air duct 24 having an inverted U-shape, the outdoor air filter 28 accommodated in the filter accommodating portion 26 of the intermediate portion 24A can be arranged at a high position. As a result, adhesion of moisture to the outdoor air filter 28 can be reliably prevented. Since the filter accommodating portion 26 can be reached easily, the outdoor air filter 28 can be easily attached/removed.

On the other hand, the outdoor air duct 24 is composed of the rising duct portion 25 rising and extending from the outdoor air inlet port 16, the filter accommodating portion 26 provided on the upper part of the rising duct portion 25, and the falling duct portion 27 falling from the filter accommodating portion 26 and reaching the indoor unit 21. Therefore, since the rising duct portion 25 connected to the outdoor air inlet port 16 rises and extends from the outdoor air inlet port 16, even if rainwater or water during carwash penetrates this rising duct portion 25, penetration of the moisture can be reliably prevented by the rising structure. As a result, the indoor unit 21 can be protected from the moisture, and the work environment in the cab box 20 can be kept favorable.

Moreover, in the operator's seat mounting portion 11 of the floor member 10, the mounting opening 14 is provided on the side of the operator's seat 17, that is, at the corner position between the seat plate 11B and the inner side surface plate 11E, and the filter accommodating portion 26 of the outdoor air duct 24 is configured to be provided by being opened upward at this mounting opening 14. As a result, even if the space in the cab box 20 is small as in the small-sized hydraulic excavator 1, the outdoor air filter 28 can be inserted into/removed from the filter accommodating portion 26 by using the space on the upper side.

It should be noted that in this embodiment, the case in which the indoor unit 21 for an air conditioner is configured to be attached on the rear surface side of the foot rest portion 12 of the floor member 10 is explained as an example. However, the present invention is not limited to the same and may be configured such that by recessing the foot rest portion on the floor member, for example, the indoor unit is accommodated in this recessed portion, and the upper side of the indoor unit is covered by a plate body. On the other hand, the indoor unit may be configured to be arranged in a space on the lower side of the seat plate 11B.

In this embodiment, the case in which the floor member 10 is configured capable of being tilted up/down by using the front side position as a fulcrum with respect to the revolving frame 5 is explained as an example. However, the present invention is not limited to the same and may be applied to a hydraulic excavator of a type in which the floor member is fixed to the revolving frame, for example.

Further, in this embodiment, the cab-specified hydraulic excavator 1 provided with the crawler type lower traveling structure 2 is explained as an example of a construction machine. However, the present invention is not limited to the same and may be applied to a hydraulic excavator and the like provided with a wheel type lower traveling structure, for example. Moreover, the present invention may be applied to other construction machines including a hydraulic crane and the like as long as it is a construction machine provided with a cab.

DESCRIPTION OF REFERENCE NUMERALS

1: Hydraulic excavator (Construction machine)
2: Lower traveling structure
3: Upper revolving structure
4: Working mechanism
5: Revolving frame
10: Floor member
11: Operator's seat mounting portion
11A: Front plate
11B: Seat plate
11E: Inner side surface plate
11F: Outer side surface plate
12: Foot rest portion
14: Mounting opening
16: Outdoor air inlet port
17: Operator's seat
20: Cab box
20C: Left side surface portion
20H: Side surface panel portion
21: Indoor unit
24: Outdoor air duct
24A: Intermediate portion
25: Rising duct portion
26: Filter accommodating portion
26A: Filter mounting port
27: Falling duct portion
28: Outdoor air filter

The invention claimed is:

1. A construction machine comprising: an automotive lower traveling structure, an upper revolving structure rotatably mounted on said lower traveling structure, and a working mechanism provided capable of moving upward/downward on said upper revolving structure, comprising:

said upper revolving structure is provided with a revolving frame forming a support structural body, a floor member provided on said revolving frame, in which the rear side is an operator's seat mounting portion on which an operator's seat is mounted and the front side is a foot rest portion on which the operator places the foot, a cab box provided by covering a periphery and an upper part of said floor member in order to form an operator's room on said floor member, an indoor unit for an air conditioner arranged on said floor member and supplying sucked air into said cab box as conditioned air, an outdoor air inlet port provided by being opened to the outside of said cab box, and an outdoor air duct provided by connecting said outdoor air inlet port and said indoor unit and supplying the outdoor air introduced through said outdoor air inlet port into said indoor unit, wherein:

said outdoor air duct is arranged so that an intermediate portion between said outdoor air inlet port and said indoor unit passes between a side surface portion of said cab box and a side portion of said operator's seat;

said outdoor air duct is formed having an inverted U-shape so that said intermediate portion comes to a highest position;

a filter accommodation portion is provided in said intermediate portion of said outdoor air duct and has a filter mounting port opened upward in said cab box; and an outdoor air filter for trapping dusts in the outdoor air flowing through said outdoor air duct is configured to be accommodated in said filter accommodating portion capable of being attached and removed through said filter mounting port.

2. The construction machine according to claim 1, wherein said outdoor air duct is composed of a rising duct portion which rises and extends from said outdoor air inlet port and becomes the upstream side of said outdoor air filter, said filter accommodating portion provided on the upper part of said rising duct portion which becomes said intermediate portion, and a falling duct portion which falls down from said filter accommodating portion and reaches said indoor unit and becomes the downstream side of said outdoor air filter.

3. The construction machine according to claim 1, wherein in said operator's seat mounting portion of said floor member, a mounting opening is provided at a location on the side of said operator's seat, and said filter accommodating portion is configured to be mounted on said mounting opening so as to open upward.

* * * * *